July 9, 1968 — J. E. CHAPMAN — 3,391,966
RESILIENT LIQUID MOUNT FOR HIGH-SPEED ROLLER BEARINGS
Filed March 28, 1966

JAMES E. CHAPMAN
INVENTOR.

BY Dominich Nardelli
ATTORNEY

United States Patent Office 3,391,966
Patented July 9, 1968

3,391,966
RESILIENT LIQUID MOUNT FOR HIGH-SPEED ROLLER BEARINGS
James E. Chapman, Marina del Rey, Calif., assignor to The Garrett Corporation, Los Angeles, Calif., a corporation of California
Filed Mar. 28, 1966, Ser. No. 537,974
12 Claims. (Cl. 308—187)

ABSTRACT OF THE DISCLOSURE

A rolling contact bearing having an outer race with an inner circumferential groove in which the rolling elements roll and having a plurality of holes communicating between the outer cylindrical surface and the groove to cause lubricating oil to be forced outwardly through the holes as the rolling elements roll, to form a hydrostatic fluid film on the outside of the outer race.

---

This invention relates generally to bearing members and, more particularly, relates to a means for providing a resilient mount for rolling-contact bearings.

In high-speed rotating apparatus wherein the rotating speed is above the first or higher order critical speeds, and wherein the inherent unbalance mass may be rotating about an axis other than the axis passing through the geometric center of the mounting assembly, the bearing mount is made resilient to allow for radial excursions of the rotating mass so that the rotating mass may rotate about its center of mass. Thus bearing reliability increases since bearing loads are minimized when the rotating mass rotates about its center of mass. Up to now, a spring-type resilient mount was installed with a rolling-contact bearing to allow for radial excursions of the shaft and bearing. However, spring-type mounts are complex mechanisms, in which each part requires very close tolerances and careful assembling procedures and wherein additional means for damping are to be provided. During prolonged operation, the spring metal fatigues and creeps eventually destroying any resiliency that may have been provided.

Accordingly, an object of this invention is to provide a resilient mount for a high-speed bearing which does not fatigue or creep.

Another object of this invention is to provide a rolling-contact bearing wherein the outer race floats within a film of oil.

Another object of this invention is to provide a liquid resilient mount for a rolling-contact bearing wherein the radial excursion of the bearing is dampened.

Another object of this invention is to produce a rolling-contact bearing which pumps oil to the exterior of outer race producing an oil film around the outer race.

Other objects, features, and advantages of the invention will hereinafter be made apparent to those skilled in the art, in the following description of an exemplary embodiment incorporating the invention, reference being made to the appended drawing forming a part of the description, in which drawing.

Figure 1:
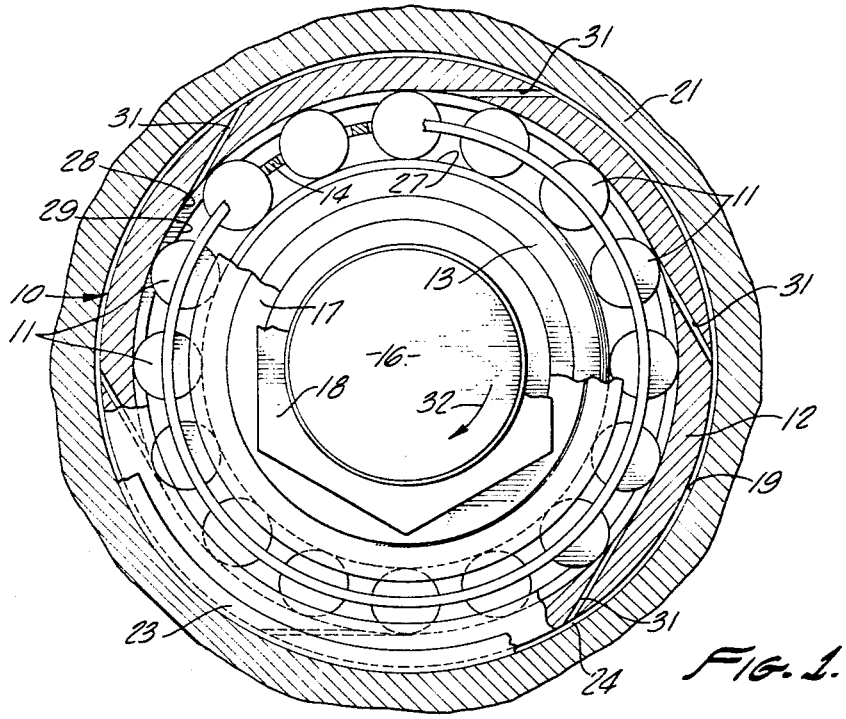
FIG. 1 is a front elevation in partial section of a roller bearing incorporating the invention.
Figure 2:
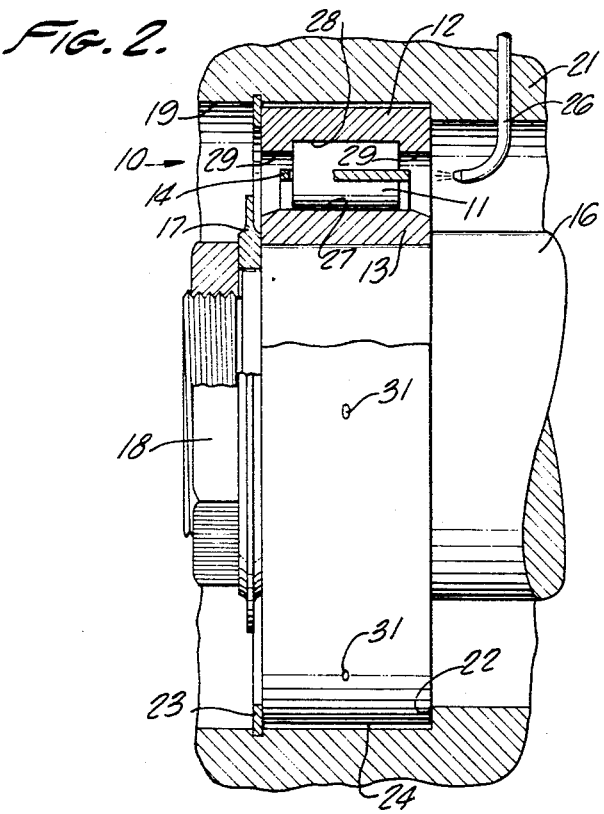
FIG. 2 is a side elevation in partial section of the roller bearing.

Referring to the drawing and to FIGS. 1 and 2, in particular, there is shown a rolling-contact bearing, for example, a roller bearing 10 with cylindrical rollers 11 disposed between an outer race 12 and an inner race 13. The rollers 11 are held evenly spaced between both races 12 and 13 by a suitable spacer 14. The bearing is shown with its inner race 13 mounted on a rotating shaft 16 and held in place by a suitable oil-slinger 17 and a retaining nut 18, screwed onto the end of the shaft 16. The outer race 12 is shown mounted within a bore 19 formed in a housing 21. The bore 19 has an inwardly extending shoulder 22 against which the outer race 12 rests. A suitable retaining ring 23 disposed on the other side of the bearing prevents the outer race 12 from moving axially.

In this invention, a small space 24, for example, .002 inch thick, is provided between the outer race 12 and the housing 21, and lubricating oil under pressure is continuously and outwardly pumped by novel means into the space 24 as the shaft 16 rotates. An oil film, being formed within the space, produces a resilient mounting means which allows for radial excursions of the bearing. Since the outer race 12 is freely disposed within bore 19, the outer race 12 is free to rotate whereby the outer race tends to become a floating journal bearing.

The novel means for outwardly forcing lubricating oil into the space 24 includes a plurality of oil holes 31, drilled evenly spaced around the outer race. In this embodiment six oil holes 31 are used to evenly distribute the oil around the outer race 12 and to supply sufficient oil under pressure. More or less oil holes may be supplied as required. The novel means operates as follows: First, the lubricating oil is sprayed onto the rollers 11 of the bearing through, for example, a nozzle 26. The inner race 13 has a flat exterior surface 27 on which the rollers 11 roll. However, the outer race 12 has an interior surface 28 with a roller guide rail 29 disposed on each side of the rollers 11. Although the outer race 12 has guide rails 29 which prevent the oil from nozzle 26 from impinging directly on surface 28, centrifugal force causes the oil to be thrown against surface 28 and then to escape through the oil holes 31 into the thin space 24. Since the shaft 16 rotates in the direction of arrow 32 (FIG. 1) the oil holes 31 in the outer race 12, preferably are drilled tangentially to inner surface 28 and in the direction of shaft rotation. Therefore, the oil escaping through the oil holes 31 follow the expected path of oil flow, and oil churning within the outer race is greatly reduced. The positive displacement force of the rollers impacting the oil into the holes 31, helped by centrifugal force, pumps the oil into the space 24 between the outer race 12 and housing 21 at a pressure of about 30 pounds per square inch to produce a resilient liquid film for the bearing to bear against in the radial direction. Thus, there is provided a bearing which has the low starting friction of a rolling-contact bearing and the resiliency and damping of a journal bearing during operation.

Figure 3:
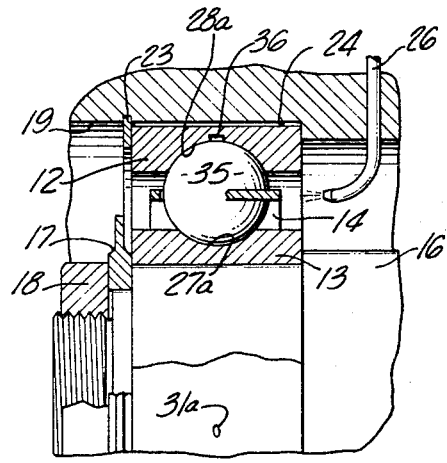
FIG. 3 is a partial side elevation in section of a ball bearing incorporating the invention.

The invention is not only limited to a rolling-contact bearing incorporating rollers 11 as shown in FIGS. 1 and 2, but other types, for example, ball bearings having balls 35 as shown in FIG. 3, can be also incorporated into the invention. As in standard ball bearings, the balls 35 contact surfaces 27a and 28a in the inner and outer race, respectively, which surfaces 27a and 28a are curved to conform to the curvature of the balls 35. However, in this embodiment, the tangential bores 31a in the outer race are, preferably, disposed so that the inner opening of the bores 31a (which are similar to bores 31 in FIG. 1) are at a point furthest away from the geometric center of the bearing. Then, in order to eliminate contact discontinuity between the balls 35 and surface 28a, a circumferential groove 36 is formed in surface 28a and the bores 31a communicate with the groove 36.

With the present disclosure in view, modification of the invention will appear to those skilled in the art. Accordingly, the invention is not limited to the exact details of the illustrated preferred embodiment but includes all

What is claimed is:
1. A rolling-contact bearing comprising:
an inner race having an outer surface;
an outer race having an inner surface concentric with an outer surface;
a plurality of rolling elements disposed to roll on the outer surface of said inner race and on the inner surface of said outer race; and
a guide rail fixed on each edge of the inner surface of said outer race and protruding inwardly therefrom so that rolling elements roll between said guide rails;
said outer race having a plurality of holes formed therethrough connecting the inner surface with the outer surface of said outer race, fluid in said outer race, and said holes being disposed to cause the rolling elements to provide a positive displacement force displacing fluid outwardly through the holes as said rolling elements roll around the inner surface and between the guide rails.

2. The bearing of claim 1 wherein:
said holes in said outer race are disposed at a tangent to said inner surface of said outer race.

3. The bearing of claim 1 wherein:
said rolling elements are cylindrical and roll on said inner surface of said outer race between said guide rails and roll on said outer surface of said inner race.

4. The bearing of claim 3 wherein:
said holes in said outer race are disposed at a tangent to said inner surface of said outer race.

5. The bearing of claim 1 wherein:
said rolling elements are balls,
said inner surface and guide rails of said outer race and said outer surface of said inner race are so shaped as to conform to said balls, to allow said balls to roll and be retained on the surfaces; and
said inner surface of said outer race having a circumferential groove communicating with said holes.

6. The bearing of claim 5 wherein:
said holes in said outer race are disposed at a tangent to said inner surface of said outer race.

7. A bearing structure for a high-speed rotating apparatus comprising, in combination:
a housing structure having a bore;
a shaft disposed within and spaced from the wall of said bore;
a rolling-contact bearing rotatably supporting said shaft within said bore;
means disposed on said bearing for forming a resilient liquid film between said bearing and the wall of said bore as said shaft rotates to allow for radial excursions of said shaft while the shaft rotates;
said rolling-contact bearing including an inner race, an outer race, and a plurality of rolling elements disposed to roll between said inner and said outer race;
means for applying oil to said rolling elements, and
said means for forming a resilient liquid film comprising a plurality of oil holes drilled through said outer race to cause the oil, under the action of the rotating rolling elements to pass through said hole under pressure and into the space formed between said outer race and the wall of said bore.

8. The bearing structure of claim 7 wherein:
said holes in said outer race are disposed at a tangent to the inner surface thereof and in the direction that said shaft would be rotating so that said oil flows from within said outer race in the expected tangential path.

9. The bearing structure of claim 7 wherein:
said inner surface of said outer race and said outer surface of said inner race are cylindrical;
a guide rail is disposed on each edge of the outer race and protruding inwardly therefrom;
said rolling elements are cylindrical and roll on the inner surface of said outer race and between said guide rails and on said outer surface of said inner race.

10. In the bearing structure of claim 9 wherein:
said holes in said outer race are disposed at a tangent to the inner surface thereof and in the direction that said shaft would be rotating so that said oil flows from within said outer race in the expected tangential path.

11. In the bearing structure of claim 7 wherein:
said rolling elements are balls,
said inner surface of said outer race and said outer surface of said inner race are so shaped as to conform to said balls to allow said balls to roll on the surfaces; and
said inner surface of said outer race having a circumferential groove communicating with said holes.

12. In the bearing structure of claim 11 wherein:
said holes in said outer race are disposed at a tangent to the inner surface thereof and in the direction that said shaft would be rotating so that said oil flows from within said outer race in the expected tangential path.

References Cited

UNITED STATES PATENTS

| 2,040,803 | 5/1936 | Buckwalter | 308—187 |
| 2,747,945 | 5/1956 | Fulton | 308—187 |

FOREIGN PATENTS

| 937,515 | 9/1963 | Great Britain. |
| 46,378 | 8/1939 | Netherlands. |

MARTIN P. SCHWADRON, *Primary Examiner.*

FRANK SUSKO, *Examiner.*